(12) United States Patent
Hipsh et al.

(10) Patent No.: US 11,175,995 B2
(45) Date of Patent: Nov. 16, 2021

(54) DATA PROTECTION FOR A DOCUMENT DATABASE SYSTEM

(71) Applicant: VMware, Inc., Palo Alto, CA (US)

(72) Inventors: Lior Hipsh, Hod Hasharon (IL); Yoel Calderon, Hod Hasharon (IL)

(73) Assignee: VMWARE, INC., Palo Alto, CA (US)

( * ) Notice: Subject to any disclaimer, the term of this patent is extended or adjusted under 35 U.S.C. 154(b) by 536 days.

(21) Appl. No.: 14/754,037

(22) Filed: Jun. 29, 2015

(65) Prior Publication Data

US 2016/0378612 A1    Dec. 29, 2016

(51) Int. Cl.
*G06F 11/14* (2006.01)
*G06F 11/10* (2006.01)
*G06F 16/27* (2019.01)

(52) U.S. Cl.
CPC ...... *G06F 11/1451* (2013.01); *G06F 11/1076* (2013.01); *G06F 16/278* (2019.01); *G06F 11/1471* (2013.01); *G06F 2201/80* (2013.01)

(58) Field of Classification Search
CPC .................................................. G06F 11/1451
See application file for complete search history.

(56) References Cited

U.S. PATENT DOCUMENTS

| | | | |
|---|---|---|---|
| 7,739,233 B1 * | 6/2010 | Ghemawat | G06F 16/1844 707/610 |
| 10,540,404 B1 * | 1/2020 | Dang | G06F 16/93 |
| 2002/0007373 A1 * | 1/2002 | Blair | G06F 17/30011 715/223 |
| 2011/0302446 A1 * | 12/2011 | Becker-Szendy | G06F 11/1076 714/6.1 |
| 2014/0317056 A1 * | 10/2014 | Kim | G06F 17/30215 707/634 |
| 2016/0013815 A1 * | 1/2016 | Wideman | H03M 13/373 714/766 |
| 2016/0179824 A1 * | 6/2016 | Donlan | G06F 17/30073 707/662 |

* cited by examiner

*Primary Examiner* — Mark D Featherstone
*Assistant Examiner* — Tony Wu
(74) *Attorney, Agent, or Firm* — Loza & Loza, LLP

(57) ABSTRACT

In an example, method of data protection in a document database system includes grouping documents input to the document database system into super documents, each of the super documents including a plurality of chunks, each of the plurality of chunks including one of the documents. The method further includes operating an object storage system according to a storage policy that implements parity processing, where the parity processing includes computing parity chunks for the super documents and storing the parity chunks in an object store, where a plurality of the parity chunks are computed for each of the super documents. The method further includes sending each of the super documents to the object storage system for parity processing according to the storage policy.

17 Claims, 6 Drawing Sheets

DATA PROTECTION FOR A DOCUMENT DATABASE SYSTEM

BACKGROUND

Document databases, sometimes referred to as NoSQL databases, are increasing in popularity. A document database stores documents as records in a schema-less manner, making it a popular solution for storing a large amount of unstructured data. In cloud environments, for example, the benefits of scale out and multi-tenancy give rise to such a large amount of unstructured data. The dominant method of data protection used for document databases is data replication. Typically, the document data is replicated one or more times, which at least doubles the required storage capacity. As such, protecting a document database using data replication is costly in terms of the storage resources required to support the replication.

Furthermore, some NoSQL databases are sharded to several nodes, where the incoming documents will be spread across the shards/nodes using a well balancing sharding key. Each shard's data is exclusive among the shards. However, each shard still replicates its data over two or more nodes to provide data-protection. The replication is mandatory, since the shards cannot recover a failed shard and since there is no overlap between data across the shards.

SUMMARY

Techniques for data protection in a document database system are described. In an embodiment, method of data protection in a document database system includes grouping documents input to the document database system into super documents, each of the super documents including a plurality of chunks, each of the plurality of chunks including one of the documents. The method further includes operating an object storage system according to a storage policy that implements parity processing, where the parity processing includes computing parity chunks for the super documents and storing the parity chunks in an object store, where a plurality of the parity chunks are computed for each of the super documents. The method further includes sending each of the super documents to the object storage system for parity processing according to the storage policy.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
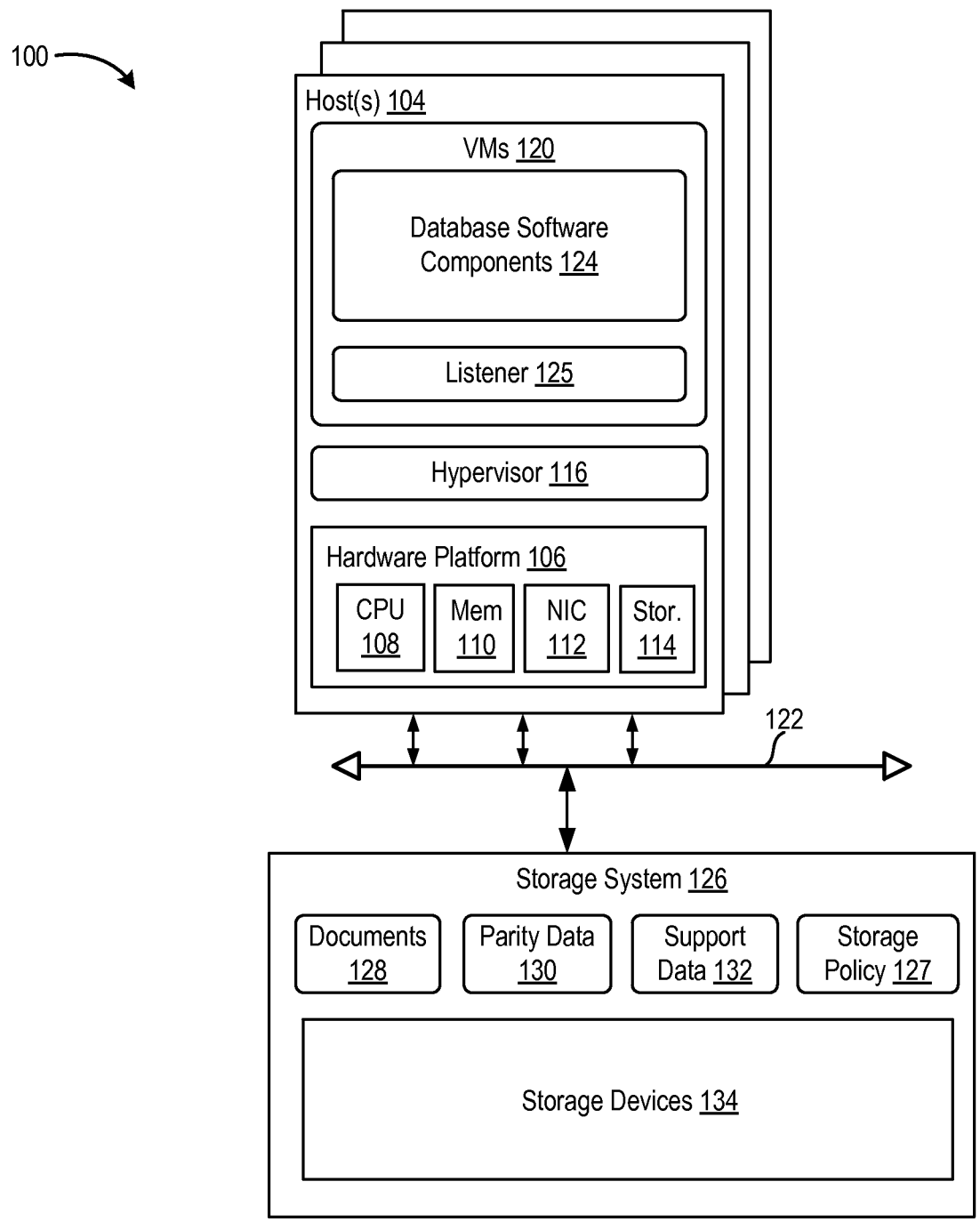
FIG. 1 is a block diagram of a computing system in which one or more embodiments of the present disclosure may be utilized.

Reference throughout this specification to "one embodiment," "an embodiment," or similar language means that a particular feature, structure, or characteristic described in connection with the indicated embodiment is included in at least one embodiment of the disclosure. Thus, the phrases "in one embodiment," "in an embodiment," and similar language throughout this specification may, but do not necessarily, all refer to the same embodiment.

Techniques for data protection in a document database system are described. In embodiments, a listener component provides an interface between a document database component and an object storage component. The document database component manages storage and retrieval of documents. In an embodiment, the document database component does not implement replication of the documents for data protection. Rather, the listener component manages parity-based data protection for the documents. The listener component detects when documents are newly added to document database component. The listener component groups new added documents into a "super document". In case of multiple shards, the grouping is performed across all shards. In case of a database having a single node, the grouping includes documents from the single node. The listener will aim to gather an equal number of chunks per database shard. The listener can include a timeout mechanism, as a specific shard may not be equally loaded in some cases. Each super document includes M chunks of the same size, and each of the M chunks includes a unique document. The listener component passes the super documents to the object storage component as objects to be processed. The object storage component is configured with an object storage policy that controls the object storage component to compute N parity chunks for each super document. The object storage policy causes the object storage component to store the N parity chunks for each super document in an object store.

In this manner, the listener component implements a parity-based data protection scheme that requires less storage capacity than traditional replication. In a typical replication scheme, a document database system can maintain two replica sets of documents alone with the original set of documents. The two replica sets of documents require twice the storage space as the original set of documents, and thus a total storage capacity of three times the size of the document set is required for such a replication scheme. In embodiments described herein, the size of the super document (M) and the number of parity chunks (N) can be set such that the required storage space is much less than three times the size of the document set.

Parity can be determined by the object storage system using any Erasure Coding (EC) scheme. Object storage systems typically store a set of data by storing a plurality of data chunks and a plurality of parity chunks. However, the object storage systems arbitrarily chunk the data set without regard to the content of the object's data. If the data set includes documents maintained by a document database system, however, the No SQL database documents cannot be arbitrarily chunked and stored, as the database is fully aware of the document content and needs quick seek time to the document internal data. The listener component provides the "document-aware" intelligence to the system by creating super document objects to be processed by the object storage system. In the methods described herein, a given document is contained in one single chunk, but yet can be a participant in a parity schema for protection. This also addresses the protection and failover support of a NoSQL shard. In a NoSQL database, a document will be stored on a single shard and is not split over multiple shards. Using a grouping method as described herein to create a super-document across different documents from different shards provides a cost effective protection parity function. These and further aspects are described below with respect to the following figures.

FIG. 1 is a block diagram of a computing system 100 in which one or more embodiments of the present disclosure may be utilized. Computing system 100 includes one or more hosts 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within computing system 100. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems, such as storage system 126. Examples of a storage interface are a host bus adapter (HBA) that couples host 104 to one or more storage arrays, such as a storage area network (SAN) or a network-attached storage (NAS), as well as other network data storage systems.

In an embodiment, each host 104 is configured to provide a virtualization layer that abstracts processor, memory, storage, and networking resources of hardware platform 106 into multiple virtual machines 120 that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of host 104 or directly on hardware components of host 104.

Computing system 100 can be used to implement a document database system. In particular, VMs 120 can be used to execute database software components 124 and a listener 125. Exemplary database software components 124 are described below with respect to FIG. 2. Database software components 124 can read data from and write data to storage system 126. Storage system 126 can store documents 128, parity data 130, and support data 132 across a plurality of storage devices 134. Documents 128 comprise the records of the database managed by database components 124. Documents 128 can include data organized using various data representations, such as JavaScript Object Notation (JSON), extensible markup language (XML), and the like. An example JSON document can specify:

```
{
    name: "John",
    age: 30,
    id:"A1B2C4"
}
```

In the example, the data is specified in terms of keys and values (e.g., key:value). Documents 128 do not have to comport with any specific schema and one document can have different key:value pairs from another document. Further, documents 128 do not have to have any specific relationships with one another. Hence, the document database system can store a large amount of unstructured data in the form of documents 128. The document database system differs from a traditional relational database, where the records are rows in tables defined by schemas and relations are defined between table columns. A document database system is a type of database system sometimes referred to as a NoSQL, or "not only SQL" database. In general, a NoSQL database provides a mechanism for storage and retrieval of data that is modeled in means other than the tabular relations of a relational database.

As described further below, listener 125 cooperates with database software components 124 to implement a data protection scheme to protect documents 128 from data loss. Database software components 124 do not employ a replication scheme. Rather, database software components 124 are configured with a customized storage policy 127 to compute parity data 130 for documents 128 to implement data protection. In an embodiment, database software components 124 are configured by storage policy 127 to employ Erasure Coding (EC) to generate parity data 130. Erasure Coding involves splitting incoming data into M chunks and encoding the M chunks into M+N chunks, where N is a number of parity chunks. To implement the parity protection, listener 125 can group documents together into super documents, where each super document includes M chunks each chunk having a document. Database software components 124 then compute N parity chunks for the super document, which are stored in parity data 130. Documents 128 and parity data 130 can be stored across storage devices 134, across logical divisions of storage devices 134 (e.g., partitions, volumes, etc.), or both. Support data 132 can include various data to facilitate operation of listener 125 and database software components 124, such as a super document index that stores a mapping between super documents and documents 128.

By generating and maintaining parity data 130, database software components 124 and listener 125 provide for data protection without employing replication. Parity data 130 occupies less storage space than one or more replicas of documents 128 that would otherwise be created if replication were employed. While database software components 124 and listener 125 are described as being executed by VMs, in other embodiments, one or more of database software components 124 and/or listener 125 can be executed by a hardware server (e.g., within an operating system operating on a hardware platform, rather than within a guest operating system operating within a virtual machine).

Figure 2:
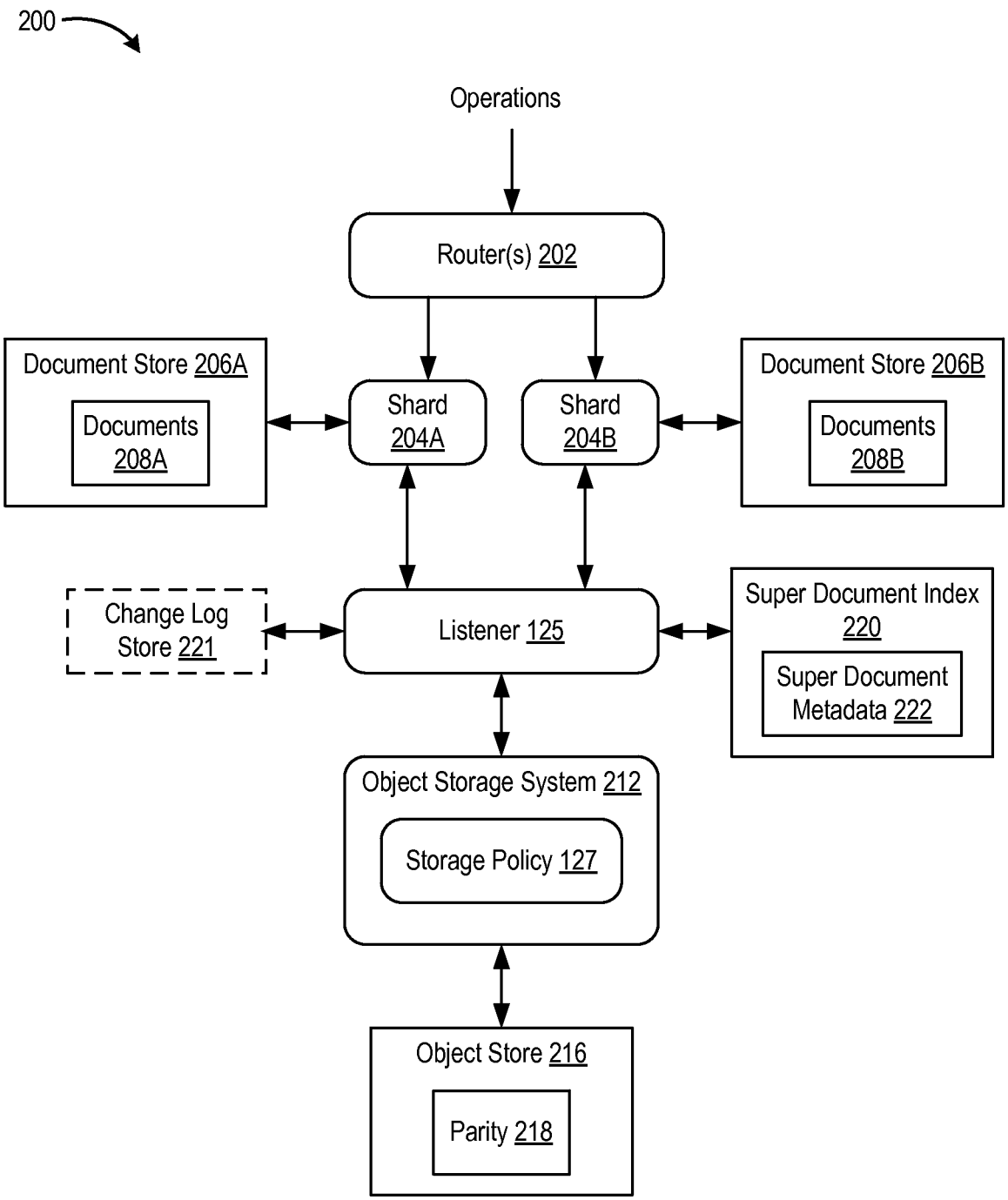
FIG. 2 is a block diagram depicting a document database system according to an embodiment.

FIG. 2 is a block diagram depicting a document database system 200 according to an embodiment. Document database system 200 can be implemented using a computing environment, such as computing system 100. Document database system 200 includes one or more routers 202, a shard 204A, a shard 204B, a listener 125, and an object storage system 212, each of which can be implementing by one or more computing systems, such as a server, virtual machine, or the like. Each shard 204A and 204B (collectively shards 204) maintains a subset of the stored documents for the document database system 200. Although two shards 204 are shown, the document database system 200 can generally include a plurality of shards. Router(s) 202 route operations across shards 204. Thus, document database system 200 includes one interface despite operations being split across multiple shards.

Each of shards 204 maintains a unique set of documents within document database system 200. In the example, shard 204A maintains a document store 206A having documents 208A, and shard 204B maintains a document store 206B having documents 208B. One commercially available document database system that operates using routers and shards is MongoDB, available from MongoDB, Inc. of Palo Alto, Calif., although other document database systems can be used. Document database systems such as MongoDB support replication of document data for data protection. Within the context of the present example, each of shards 204 can be configured to replicate documents across different storage devices/systems for redundancy. In a typical configuration, each shard maintains two replicas of the documents. Three sets of documents require three times the storage space.

In an embodiment, documents 208A and 208B are not replicated. Rather, listener 125 polls shards 204 for inserted documents (new documents). In an embodiment, listener 125 can simulate a replication endpoint for shards 204 and document insertions can be communicated to listener 125 through an existing replication channel. Listener 125 groups new documents into a super document having M documents. A given super document can have documents from shard 204A, documents from shard 204B, or documents from both shard 204A and 204B. Listener 125 forms each super document by generating M chunks. Each of the M chunks includes one document. Documents can have different sizes from one another. As such, listener 125 can pad one or more documents in each super document with zeros so that each of the M chunks has the same size. Different super documents can have chunk sizes. Within a super document, chunks are the same size to support generation of parity data, as described below.

Object storage system 212 stores data in object store 216 as objects. An object is a set of data, and each object can have associated metadata. One commercially available object storage system is OpenStack Swift available from SwiftStack, Inc. of San Francisco, Calif., although other object storage systems can be used. In an embodiment, the objects processed by object storage system 212 are super documents formed by listener 125. Object storage system 212 is configured with a storage policy 127 that determines how objects are processed. In an embodiment, storage policy 127 is configured to have object storage system 212 compute N parity chunks for each super document formed by listener 125. Storage policy 127 further dictates that object storage system 212 store the N parity chunks for each super document in object store 216 as parity data 218. Object storage system 212 can use any type of EC technique to generate parity data 218. Notably, the M chunks of each super document are not stored in object store 216. Rather, the documents are stored in the document stores managed by shards 204. Hence, within document database system 200, one set of documents is stored and managed by shards 204, and one set of parity data is stored and managed by object storage system 212. The objects stored in object store 216 comprise only parity chunks for the super documents.

Listener 125 also generates metadata for each super document, which can include various types of information describing a super document. Listener 125 can maintain a super document index 220 to store super document metadata 222. In an embodiment, super document index 220 can be a document database, where each document specifies metadata for a given super document. Super document metadata 222 can also be used by object storage system 212 as metadata for the stored objects (parity chunks). In an embodiment, metadata for a super document can include identifier information for the documents in the M chunks. An example of the metadata is described below with respect to FIG. 4.

Figure 3:
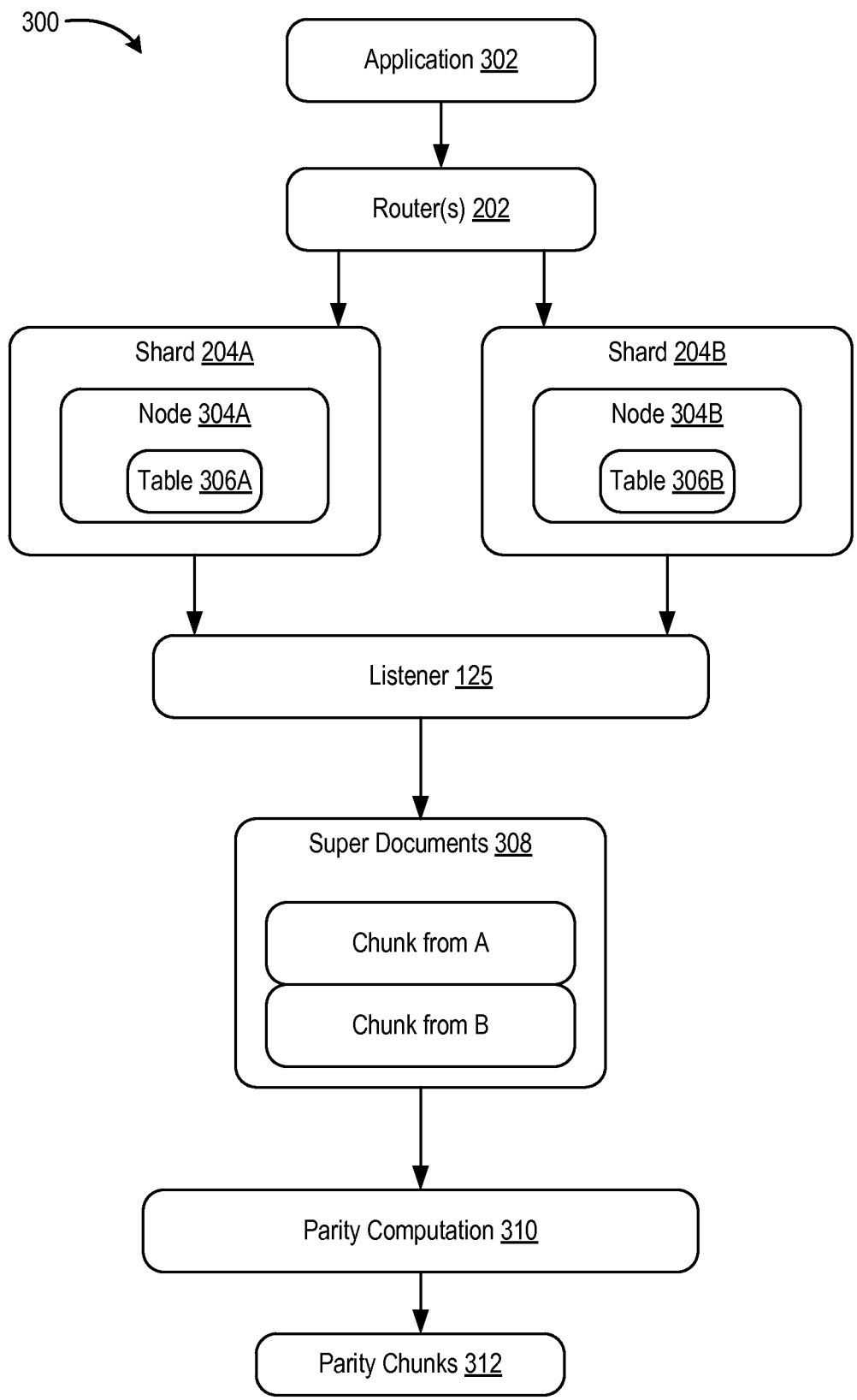
FIG. 3 is a block diagram depicting a document protection flow 300 according to an embodiment.

FIG. 3 is a block diagram depicting a document protection flow 300 according to an embodiment. Routers 202 receive documents from an application 302. Routers 202 route incoming documents among shards 204A and 204B, as discussed above. Shard 204A implements a node 304A having a table 306A, and shard 204B implements a node 304B having a table 306B. Table 306A maintains a list of documents allocated to shard 204A, and table 306B maintains a list of documents allocated to shard 204B. Listener 125 obtains incoming documents from shards 204A and 204B. Listener 125 generates super documents 308 from the incoming documents. Each super document 308 can include data chunks from one or both of the shards 204A and 204B. Listener 125 outputs super documents 308 for parity computation 310, which generates parity chunks 312.

Figure 4:
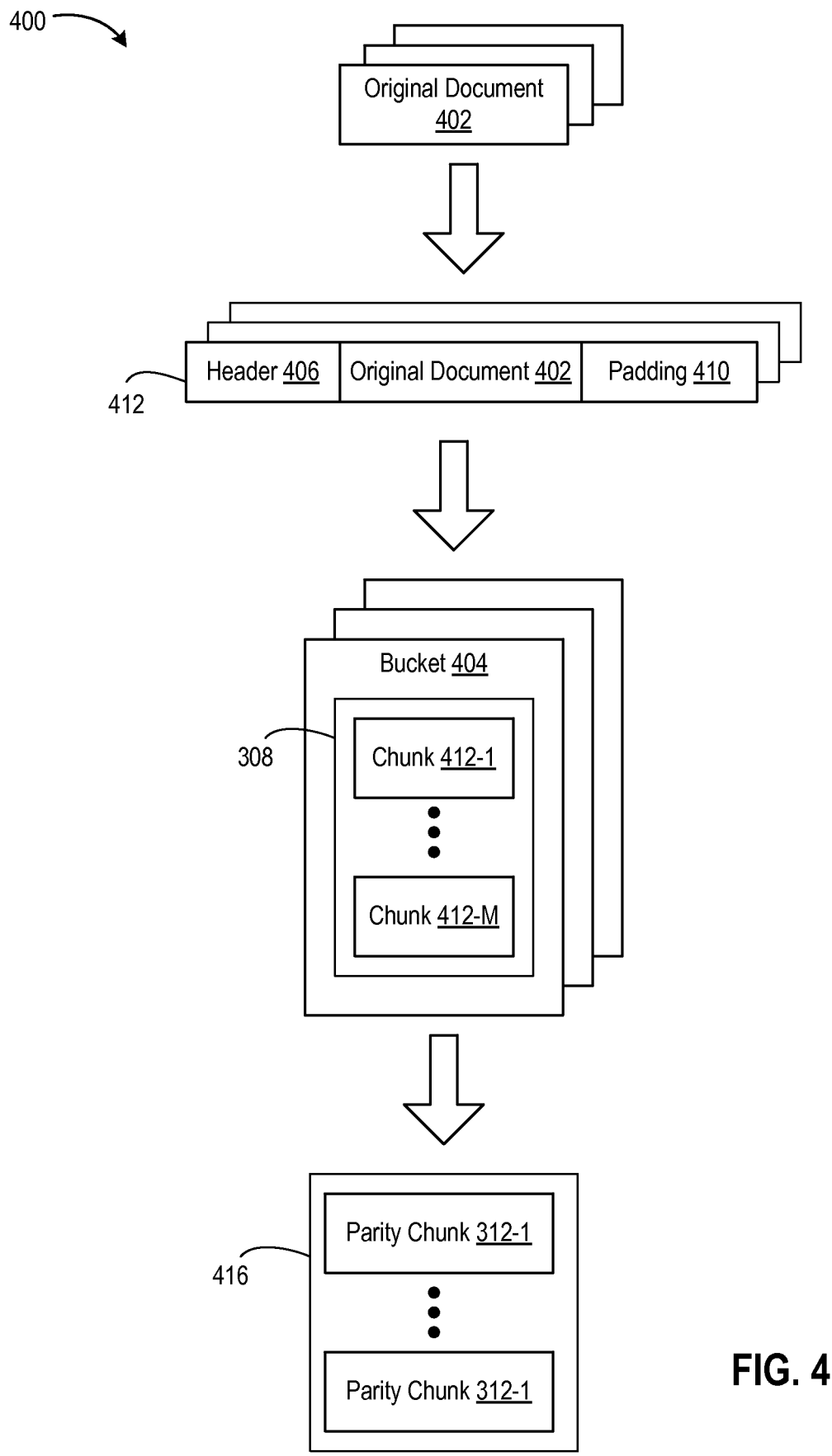
FIG. 4 is a data flow diagram depicting a method of processing documents in a document database system according to an embodiment.

FIG. 4 is a data flow diagram depicting a method 400 of processing documents in a document database system according to an embodiment. Method 400 can be performed by document database system 200 shown in FIG. 2. Method 400 begins with original documents 402 obtained by listener 125 from shards 204. In general, listener 125 groups original documents 402 into super documents 308, where each super document 308 includes M chunks 412-1 through 412-M (chunks 412). Listener 125 generates chunks 412 as original documents 402 are received. Each chunk 412 can include a header 406, an original document 402, and optionally padding 410. Header 406 can include metadata for original document 402.

Chunks 412 in a given super document 308 are of the same size. Listener 125 can establish one or more buckets 404 for chunks 412, where each bucket 404 receives chunks 412 of the same size level (e.g., 8-16 KB). For example, one bucket 404 can accept chunks each comprising X units (e.g., bytes, kilobytes (KBs), etc.), while another bucket 404 can accept chunks each comprising Y units. If a given document plus header is less than the chunk size, padding 410 can be added. When a bucket 404 receives M chunks, listener 125 forms a super document 308 from the M chunks.

Listener 125 provides super documents 308 to object storage system 212 for processing. Object storage system 212 is configured by storage policy 127 to generate a set 416 of N parity chunks 312-1 through 312-N (parity chunks 312)

for each super document and store parity chunks 312 in object store 216. Object storage system 212 can compute parity chunks 312 using an EC technique, as described above.

Returning to FIG. 2, listener 125 can support restore operations to recover lost documents. Listener 125 can also support document update operations. To support the restore and update operations, listener 125 generates metadata for each super document. In an embodiment, each metadata for a super document holds a list of original object IDs in the document database, which can be a unique primary key across all shards 204. An example of metadata for a super document is:

```
{_Id:0x100, Num_of_Orig_Docs:8,
 Bucket_Block_alignment:512-1024,
    {Orig_id:0x3740172403,Orig_Shard:A, Size:987},
    {Orig_id:0x66e3172403,Orig_Shard:B, Size 787},
    {Orig_id:0x23345172403,Orig_Shard:A, Size: 1003}
    ...
}
```

In the example, the metadata specifies that a super document having an ID of 0x100 includes eight original documents having a chunk size of 1024 units (e.g., 512-1024 bytes). The metadata specifies an original ID (Orig_id) and shard ID (Orig_Shard) for each document. In case of shard failure, listener 125 can query super document index 220 to obtain super document IDs needed to restore a shard. Given the super document IDs, listener 125 can obtain documents from the operating shards and parity data from object storage system 212 to recover documents lost due to the failed shard.

For restoring of a failed shard, listener 125 can obtain metadata for all the super documents that contain documents for the failed shard from super document index 220. Listener 125 can fetch, per super document, all the documents from the remaining shards, as well as the parity chunks from object storage system 212. Listener 125 can then calculate the shard documents from the parity and write the documents back to an available shard.

For an update operation, in an embodiment, listener 125 can query super document index 220 for the super document containing the updated document. From the super document, listener 125 can obtain the other M-1 documents that need to be fetched from shards 204. Once the updated document and the other M-1 documents are obtained, listener 125 can send the updated super document to object storage system 212 for re-computation of the parity data.

In another embodiment, the re-reading of document for updated parity calculation can be eliminated. Instead, a side copy of the modified document can be saved. Such a side copy can be stored in a change log store 221 by listener 125. Upon recovery of a lost document, listener 125 can detect that the super document contains an older version of the document in change log store 221. Listener 125 can fetch the older document and calculate the original document using the original documents pointed from the super document together with the N parity chunks.

To save disk space used to store modified documents in change log store 221, listener 125 can support a compacting mechanism. The compacting can be executed periodically. Listener 125 can fetch oldest documents in change log store 221 and can re-calculate the corresponding super documents using the newer versions of the documents. Once parity is re-calculated, the old copies of the documents can be deleted. Such a technique provides for less read operations.

In another embodiment, listener 125 can compare an old document against an updated document to identify which bytes have been changed. Listener 125 can obtain the super document for the updated document using super document index 220. Given the super document ID, listener 125 can request object storage system 212 to update parity for the super document based on the changed bytes of a given chunk (out of the M chunks).

In an embodiment, listener 125 can support data deletion in the same manner as document update. Given a deleted document, listener 125 can obtain the super document from super document index 220. Given the super document ID, listener 125 can request object storage system 212 to update parity for the super document based on an empty chunk for the deleted document (out of the M chunks).

Figure 5:
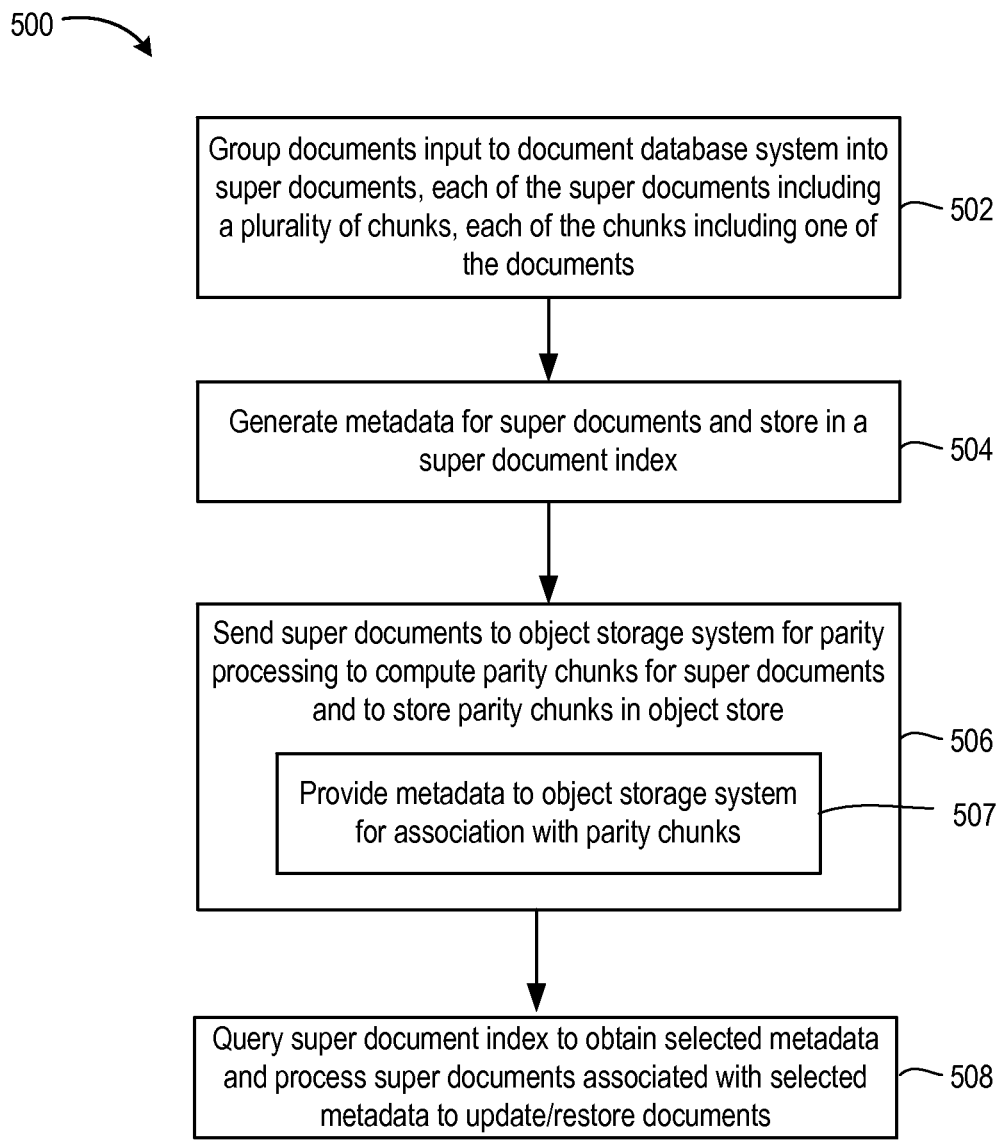
FIG. 5 is a flow diagram depicting a method of data protection in a document database system according to an embodiment.

FIG. 5 is a flow diagram depicting a method 500 of data protection in a document database system according to an embodiment. Method 500 can be performed by listener 125 described above. Method 500 begins at step 502, where listener 125 groups documents input to the document database system into super documents. Each of the super documents includes a plurality of chunks (e.g., M chunks). Each of the chunks includes one of the documents.

At step 504, listener 125 generates metadata for the super documents and stores the metadata in super document index 220. In an embodiment, the metadata relates documents to super documents. In an embodiment, the metadata further relates shards 204 to the documents and the super documents.

At step 506, listener 125 sends super documents to object storage system 212 for parity processing to compute parity chunks for super documents and store the parity chunks in object store 216 based on storage policy 127. At step 507, listener 125 can provide the metadata to object storage system 212 for association with the parity chunks.

At step 508, listener 125 can query super document index 220 to obtain selected metadata and process super documents associated with the selected metadata to update/restore documents. For example, given a failed shard 204, listener 125 can query super document index 220 to obtain IDs for all super documents having lost documents. Listener 125 can then retrieve selected documents from document database system 200 and selected parity chunks from object storage system 212 to recover the lost documents. In another example, given an updated or deleted document, listener 125 can query super document index 220 to obtain selected metadata for a selected super document having the updated or deleted document. Listener 125 can then modify the selected super document based on the selected metadata and send the modified super document to object storage system 212 to update parity chunks associated with the modified super document.

Figure 6:
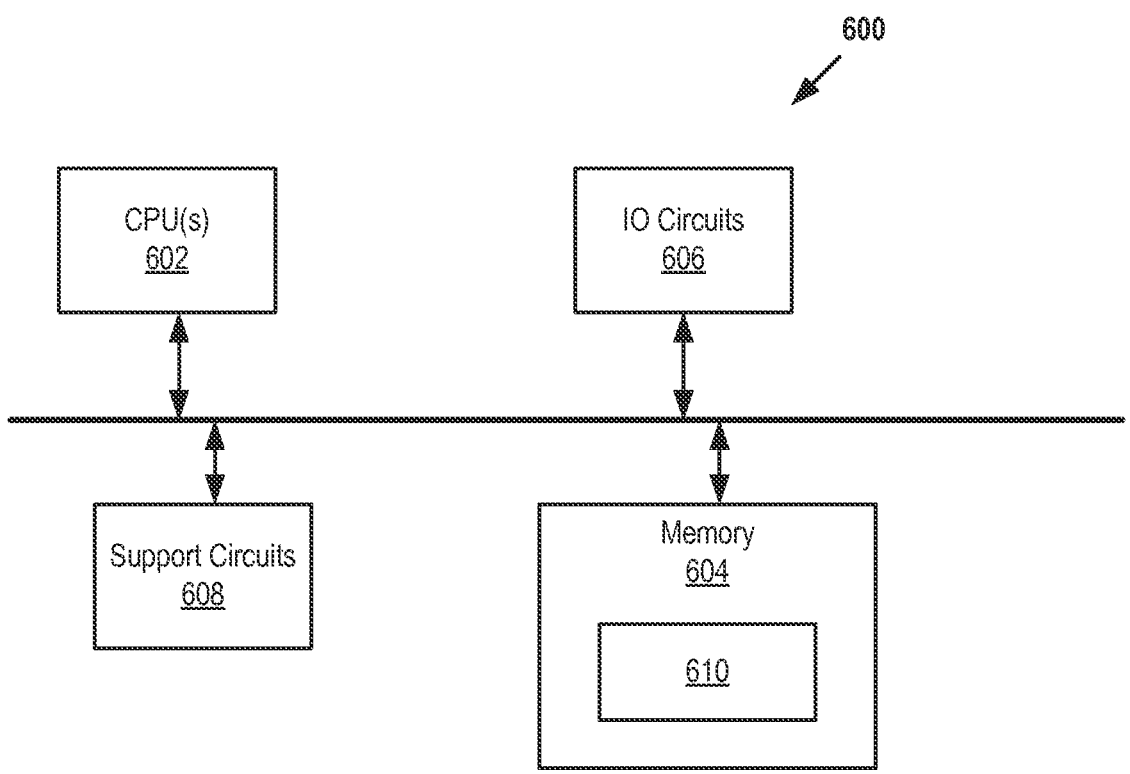
FIG. 6 is a block diagram depicting an example of a computer system in which one or more embodiments of the present disclosure may be utilized.

FIG. 6 is a block diagram depicting an example of a computer system 600 in which one or more embodiments of the present disclosure may be utilized. Computer system 600 can be used implement listener 125. Computer system 600 includes one or more central processing units (CPUs) 602, memory 604, input/output (I/O) circuits 606, and various support circuits 608. Each of CPUs 602 can include any microprocessor known in the art and can execute instructions stored on computer readable storage, such as memory 604. Memory 604 can include various volatile and/or non-volatile memory devices, such as random access memory (RAM), read only memory (ROM), and the like. Instructions and data 610 for performing the various methods and techniques described above can be stored in memory 604 for execution by CPUs 602. That is, memory 604 can store instructions executable by CPUs 602 to perform method 500 and implement listener 125. Support circuits 608 include various circuits used to support operation of a computer system as known in the art.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtual computing instance" as used herein is meant to encompass both VMs and OS-less containers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of data protection in a document database system, comprising:

placing documents input to the document database system into same sized chunks of super documents such that each of the chunks of the super documents includes one of the documents and a header that includes document metadata of the one of the documents, wherein the documents are NoSQL database documents, wherein the documents have different sizes and at least some of the plurality of chunks are padded with padding in addition to a unique document so that each of the chunks has the same size;

generating and storing metadata for the super documents in a super document index, wherein the metadata for each of the super documents includes identifiers for the documents included in that super document;

sending each of the super documents to an object storage system for parity processing according to a storage policy, wherein the parity processing includes computing a plurality of parity chunks for each of the super documents and storing the parity chunks in an object store;

querying the super document index to obtain particular metadata for associated super documents; and processing the associated super documents to update or restore at least some of the documents in the associated super documents using the parity chunks of the associated super documents stored in the object store.

2. The method of claim 1, wherein the documents are stored in a document store managed by the document database system.

3. The method of claim 1, wherein the document database system includes a plurality of shards, and wherein the plurality of chunks for each of the super documents includes documents from at least one of the plurality of shards, wherein each of the shards maintains a unique set of documents.

4. The method of claim 1, further comprising:
providing the metadata to the object storage system for association with the parity chunks.

5. The method of claim 1, wherein the document database system includes a plurality of shards, wherein each of the shards maintains a unique set of documents, the method further comprising:
querying the super document index to obtain selected metadata based on a shard identifier for a failed shard of the plurality of shards;
retrieving selected documents from operating shards of the plurality of shards based on the selected metadata;
retrieving selected parity chunks from the object storage system based on the selected metadata; and
restoring lost documents managed by the failed shard from the selected documents and the selected parity chunks.

6. The method of claim 1, further comprising:
querying the super document index to obtain selected metadata of a selected super document based on a document identifier;
modifying a selected super document based on the selected metadata to delete a document from the selected super document or to update a document in the selected super document; and
sending the selected super document to the object storage system to update the plurality of parity chunks associated with the selected super document based on the modified super document.

7. A computer system, comprising:
a memory configured to store software; and
a processor configured to execute the software to implement a listener in communication with a document database system and an object storage system, the listener configured to:
place documents input to the document database system into same sized chunks of super documents such that each of the chunks of the super documents includes one of the documents and a header that includes document metadata of the one of the documents, wherein the documents are NoSQL database documents, wherein the documents have different sizes and at least some of the plurality of chunks are padded with padding in addition to a unique document so that each of the chunks has the same size;
generate and store metadata for the super documents in a super document index, wherein the metadata for each of the super documents includes identifiers for the documents included in that super document;
send each of the super documents to the object storage system for parity processing according to a storage policy, where the parity processing includes computing a plurality of parity chunks for each of the super documents and storing the parity chunks in an object store;
query the super document index to obtain particular metadata for associated super documents; and
process the associated super documents to update or restore at least some of the documents in the associated super documents using the parity chunks of the associated super documents stored in the object store.

8. The computer system of claim 7, wherein the documents are stored in a document store managed by the document database system.

9. The computer system of claim 7, wherein the document database system includes a plurality of shards, and wherein the plurality of chunks for each of the super documents includes documents from at least one of the plurality of shards, wherein each of the shards maintains a unique set of documents.

10. The computer system of claim 7, wherein the listener is further configured to:
provide the metadata to the object storage system for association with the parity chunks.

11. The computer system of claim 8, wherein the document database system includes a plurality of shards, wherein each of the shards maintains a unique set of documents, the listener is further configured to:
query the super document index to obtain selected metadata based on a shard identifier for a failed shard of the plurality of shards;
retrieve selected documents from operating shards of the plurality of shards based on the selected metadata;
retrieve selected parity chunks from the object storage system based on the selected metadata; and
restore lost documents managed by the failed shard from the selected documents and the selected parity chunks.

12. The computer system of claim 8, wherein the listener is further configured to:
query the super document index to obtain selected metadata of a selected super document based on a document identifier;
modify a selected super document based on the selected metadata to delete a document from the selected super document or to update a document in the selected super document; and
send the selected super document to the object storage system to update the plurality of parity chunks associated with the selected super document based on the modified super document.

13. A non-transitory computer readable medium comprising instructions, which when executed in a computer system, causes the computer system to carry out a method of data protection in a document database system, comprising:

placing documents input to the document database system into same sized chunks of super documents such that each of the chunks of the super documents includes one of the documents and a header that includes document metadata of the one of the documents, wherein the documents are NoSQL database documents, wherein the documents have different sizes and at least some of the plurality of chunks are padded with padding in addition to a unique document so that each of the chunks has the same size;

generating and storing metadata for the super documents in a super document index, wherein the metadata for each of the super documents includes identifiers for the documents included in that super document;

sending each of the super documents to an object storage system for parity processing according to a storage policy, where the parity processing includes computing a plurality of parity chunks for each of the super documents and storing the parity chunks in an object store;

querying the super document index to obtain particular metadata for associated super documents; and processing the associated super documents to update or restore at least some of the documents in the associated super documents using the parity chunks of the associated super documents stored in the object store.

14. The non-transitory computer readable medium of claim 13, wherein the documents are stored in a document store managed by the document database system.

15. The non-transitory computer readable medium of claim 13, wherein the document database system includes a plurality of shards, and wherein the plurality of chunks for each of the super documents includes documents from at least one of the plurality of shards, wherein each of the shards maintains a unique set of documents.

16. The non-transitory computer readable medium of claim 13, wherein the document database system includes a plurality of shards, wherein each of the shards maintains a unique set of documents, the method further comprising:

querying the super document index to obtain selected metadata based on a shard identifier for a failed shard of the plurality of shards;

retrieving selected documents from operating shards of the plurality of shards based on the selected metadata;

retrieving selected parity chunks from the object storage system based on the selected metadata; and restoring lost documents managed by the failed shard from the selected documents and the selected parity chunks.

17. The non-transitory computer readable medium of claim 13, further comprising:

querying the super document index to obtain selected metadata of a selected super document based on a document identifier;

modifying a selected super document based on the selected metadata to delete a document from the selected super document or to update a document in the selected super document; and sending the selected super document to the object storage system to update the plurality of parity chunks associated with the selected super document based on the modified super document.

\* \* \* \* \*